United States Patent Office 3,509,157
Patented Apr. 28, 1970

3,509,157
23,24-SECOSTRYCHNIDINE DERIVATIVES
Richard W. Rees, Newton Square, and Herchel Smith, Wayne, Pa., assignors to American Home Products Corporation, New York, N.Y., a corporation of Delaware
No Drawing. Filed Oct. 31, 1966, Ser. No. 590,513
Int. Cl. C07d 43/34
U.S. Cl. 260—287
5 Claims

ABSTRACT OF THE DISCLOSURE

The alkaloids strychnine, pseudostrychnine, and strychnidine are subjected to a reduction process. The final products produced are 23,24-secostrychnidines which have been found to possess antidepressant and tranquilizing activity.

This invention relates to and has for its objects the provision of new physiologically active compounds, novel processes for their production and new methods of treatment with preparations containing the active compounds.

More particularly, this invention relates to strychnidine compounds selected from the group consisting of those having the formula:

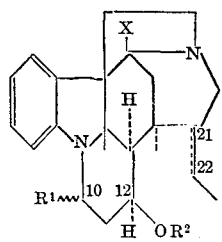

(I)

and the quaternary salts thereof, wherein the 21,22-position is saturated or double-bonded; ($) represents the cis or trans position to the C-12 hydrogen; X is hydrogen or hydroxy; $R^1$ is hydrogen or hydroxy; and $R^2$ is hydrogen or acyl, with the proviso that $R^2$ is acyl only when $R^1$ is hydrogen.

Among the suitable acyls may be mentioned the acyl radicals of a hydrocarbon carboxylic acid of less than 12 carbon atoms, as emplified by the lower alkanoic acids (e.g., acetic, propionic, butyric, hexanoic, decanoic and enanthic acid), and the lower alkenoic acids (e.g., acrylic acid), the cycloalkane carboxylic acids (e.g., cyclobutane carboxylic acid), the monocyclic aromatic carboxylic acids (e.g., benzoic), and monocyclic aryl lower alkanoic acids (e.g., phenacetic and β-phenyl propionic acid).

The final products of this invention are physiologically active substances which surprisingly possess both antidepressant and tranquillizing activity at doses showing no strychnine-like convulsant activity. Hence, the compounds of this invention may be used in lieu of imipramine.

The compounds of the present invention can be prepared and administered to warm-blooded animals, in a wide variety of oral and parenteral dosage forms.

For preparing pharmaceutical compositions from the physiologically active compounds of this invention, pharmaceutically acceptable carriers can be either solid or liquid. Solid form preparations include powders, tablets, dispersible granules, capsules, cachets and suppositories. A solid carrier can be one or more substances which may also act as diluents, flavoring agents, solubilizers, lubricants, suspending agents, binders or tablet-disintegrating agents: it can also be an encapsulating material. In powders the carrier is a finely divided solid which is in admixture with the finely divided compound. In the tablets the compound is mixed with carrier having the necessary binding properties in suitable proportions and compacted in the shape and size desired. The powders and tablets preferably contain from 5 or 10 to 99% of the active ingredient. Suitable solid carriers are magnesium carbonate, magnesium stearate, talc, sugar, lactose, pectin, dextrin, starch, gelatin, tragacanth, methyl cellulose, sodium carboxymethylcellulose, a low melting wax, and cocoa butter. The term "preparation" is intended to include the formulation of the compound with encapsulating material as carrier providing a capsule in which the compound (with or without other carriers) is surrounded by carrier, which is thus in association with it. Similarly, cachets are included. Tablets, powders, cachets and capsules can be used for oral administration.

Liquid form preparations include solutions, suspensions and emulsions. As an example may be mentioned water-propylene glycol solutions for parenteral injection. Liquid preparations can also be formulated in solution in aqueous polyethylene glycol solutions. Aqueous suspensions suitable for oral use can be made by dispensing the finely divided compound in water with viscous material, natural or synthetic gums, resins, etc., for example, gum arabic, ion-exchange resins, methylcellulose, sodium carboxymethylcellulose and other well known suspending agents.

Preferably, the pharmaceutical preparation is in unit dosage form. In such form, the preparation is sub-divided in unit doses containing appropriate quantities of the compound: the unit dosage form can be a packaged preparation, the package containing discrete quantities of preparation, for example, packeted powders of vials or ampules.

The unit dosage form can be a capsule, catchet or tablet itself, or it can be the appropriate number of any of these in packaged form. The quantity of compound in a unit dose of preparation may be varied or adjusted from a 0.5 mg. to 100 mg. (generally within the range of 0.5 to 10 mg. for use as an anti-depressant agent and 10 to 50 mg. for use as a tranquillizer) according to the particular application and the potency of the active ingredient.

The claimed compositions have physiologically activity can be incorporated into pharmaceutical formulations including sustained-release agents.

The compounds of this invention can be prepared by reducing a compound of the Formula II:

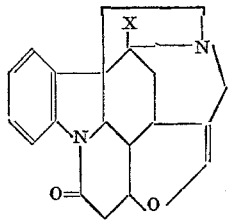

(II)

wherein X is as hereinbefore defined, in liquid ammonia with a lower alkanol and a metal from Group I or Group II of the Periodic Table, preferably sodium, to yield compounds of the formulae:

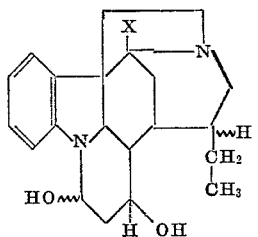

(III)

and

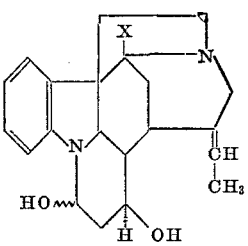

(IV)

wherein X is as hereinbefore defined.

Higher yields of compounds of Formula III are obtained by prolonged reduction of the initial compound.

Alternatively, the final products can be prepared by similarly reducing a compound of the Formula V:

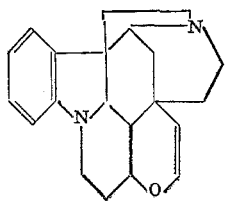

(V)

to yield compounds of the formulae:

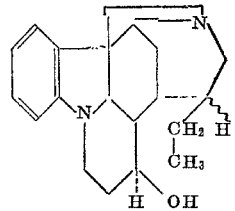

(VI)

and

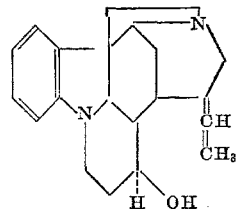

(VII)

The esters of this invention can be prepared by acylating the corresponding hydroxy compounds in the usual manner. Thus, to prepare the 12-acyloxy derivatives wherein the acyl radical corresponds to the acyl radical of a hydrocarbon carboxylic acid of less than twelve carbon atoms, either the acyl halide or acid anhydride of a lower alkanoic acid, lower alkenoic acid, monocyclic aryl lower alkenoic acid, cycloalkane carboxylic acid or cycloalkene carboxylic acid is employed as a reactant.

The tertiary nitrogen atoms of the final products of this invention may be quaternized by any conventional method, such as by treatment with an alkyl halide in an organic solvent.

The following examples illustrate the invention (all temperatures being in centigrade):

EXAMPLE 1

21,22-dihydro-10-hydroxy-23,24-secostrychnidine 1.5 gm. of sodium is added piecemeal over a 45 minute period to a vigorously stirred suspension of 2.0 gm. of strychnine in 300 ml. of liquid ammonia containing 2 ml. of ethanol. After a further 10 minutes, 2.0 gm. of ammonium chloride is added and the ammonia is allowed to evaporate. Water is added to the residue, and the precipitate is filtered off, washed with water, dried and recrystallized from ethyl acetate to yield 21,22-dihydro-10-hydroxy-23,24-secostrychnidine as fine needles having a melting point of 164–166°, $[\alpha]_D^{24°}+21.4$, seen from the proton nuclear magnetic resonance spectrum of Table I to contain about 20% of the 10-hydroxy-23,24-secostrychnidine.

*Analysis.*—Calcd. for $C_{21}H_{28}N_2O_2$ (percent): C, 74.1; H, 8.3; N, 8.2. Found (percent): C, 74.1; H, 8.4; N, 8.1.

EXAMPLE 2

10-hydroxy-23,24-secostrychnidine 14 gm. of sodium is added piecemeal over a 1.5 hour period to a vigorously stirred dispersion of 20 gm. strychnine in 1.6 l. of liquid ammonia containing 20 ml. of ethanol. 5 gm. of ammonium chloride is then added and the mixture worked up as in Example 1 to yield 9.0 gm. of 10-hydroxy-23,24-secostrychnidine as fine needles having a melting point of 158–162°, $[\alpha]_D^{24}+60.2°$.

*Analysis.*—Calcd. for $C_{21}H_{26}N_2O_2$ (percent): C, 74.5; H, 7.7. Found (percent): C, 74.1; H, 7.7.

EXAMPLE 3

21,22-dihydro-23,24-secostrychnidine 15 gm. of sodium is added piecemeal over a 2.5 hour period to a vigorously stirred dispersion of 20 gm. of strychnidine in 3 l. of liquid ammonia containing 24 ml. of methanol. After a further 15 minute period, 20 gm. of ammonium chloride is added followed by 200 ml. of water. The ammonia is allowed to evaporate overnight, and the residue is recrystallized from ethyl acetate-benzene to yield 11.5 gm. of 21,22-dihydro-23,24-secostrychnidine as a benzene solvate having a melting point of 160–165° (after preliminary softening above 120°).

*Analysis.*—Calcd. for $C_{21}H_{28}N_2O$, 0.5 $C_6H_6$ (percent): C, 79.3; H, 8.6; N, 7.7. Found (percent): C, 79.1; H, 8.4; N, 7.1.

EXAMPLE 6

To prepare 5000 tablets, each containing 5 mg. of 21,22-dihydro-10-hydroxy-23,24-secostrychnidine the following process is employed:

25 gm. of 21,22-dihydro-10-hydroxy-23,24-secostrychnidine is passed through a 60 mesh stainless steel screen and then thoroughly blended with 215 gm. of milk sugar and 215 gm. of sucrose containing 3% starch. The mixture is granulated with 40 gm. of starch paste made from one part starch and seven parts of water. The granulation is dried and pressed through a No. 20 screen, 17.5 gm. of talc, 35 gm. of corn starch and 1 gm. of magnesium stearate are blended into the mixture and the mixture is compressed into one-fourth inch concave tablets.

Similarly, all the other compounds of this invention may be tableted.

TABLE I.—NUCLEAR MAGNETIC RESONANCE DATA [a]

| Compound | $C_1$–$C_4$ | $C_{22}$ | $C_{12}$ | $C_{10}$ | $C_{23}$ [b] | $C_{23}$ [c] | Acetate Methyl |
|---|---|---|---|---|---|---|---|
| Strychnine | 7.08–8.1 (m)(4) | 5.89 (t)(1) | | | | | |
| Strychnidine | 6.2–7.4 (m)(4) | 5.82 (t)(1) | | | | | |
| 21,22-dihydro-10-hydroxy-23,24-secostrychnidine (Example 1) [d] | 6.4–7.4 (m)(4) | 5.56 (q)(0.2) | | 5.31 (m)(1) | 1.70 (d) | 0.89 (t)(2.4) | |
| 10-hydroxy-23,24-secostrychnidine (Example 2) | 6.4–7.4 (m)(4) | 5.56 (q)(1) | | 5.31 (m)(1) | 1.70 (d)(3) | | |
| 21,22-dihydro-23,24-secostrychnidine (Example 3) | 6.4–7.4 (m)(4) | | | | | | |
| 21,22-dihydro-23,24-secostrychnidine acetate (Example 4) | 6.4–7.4 (m)(4) | 5.20 (m)(t) | | | | 0.92 (t)(3) | 2.15 (s)(3) |

[a] Determined for deuteriochloroform solutions on a Varian A-60 Spectrometer, with tetramethylsilane as internal standard. Data are presented as units. s=singlet, d=doublet, t=triplet, q=quartet, m=multiplet. Centers of gravity were estimated visually for all signals except the aromatic multiplets. Figures in parentheses give estimates of the proton contents of the corresponding signals estimated by assuming the right aromatic proton content.
[b] When $\Delta^{21}$ is present.
[c] When $\Delta^{21}$ is saturated.
[d] Estimated to contain about 20 percent of 10-hydroxy-23,24-secostrychnidine.

An aliquot of the above solvate was distilled at 230°/2 mm. to give the 21,22-dihydro-23,24-secostrychnidine as a glass.

*Analysis.*—Calcd. for $C_{21}H_{28}N_2O$ (percent): C, 77.7; H, 8.7. Found (percent): C, 78.0; H, 8.7.

EXAMPLE 4

21,22-dihydro-23,24-secostrychnidine acetate 0.5 gm. of 21,22-dihydro-23,24-secostrychnidine is placed in 5 ml. of pyridine and 4 ml. of acetic anhydride at room temperature for 24 hours. The solvent is evaporated in vacuo and ether-chloroform is added to the residue. The solution is washed with 2 N aqueous sodium carbonate, water and then dried. Recrystallization of the product from hexane yields 21,22-dihydro-23,24-secostrychnidine acetate having a melting point of 154–159°, which, after distillation at 195°/2 mm. had a melting point of 130–160°.

*Analysis.*—Calcd. for $C_{23}H_{30}N_2O_2$ (percent): C, 75.4; H, 8.25; N, 7.6. Found (percent): C, 75.2; H, 8.3; N, 7.9.

In a similar manner by substituting any other acid anhydride or acyl chloride for the acetic anhydride in the procedure of Example 4, the corresponding ester is formed.

EXAMPLE 5

10ξ-hydroxy-23,24-secopseudostrychnidine and 21,22-dihydro-10ξ-hydroxy-23,24-secopseudostrychnidine Following the procedure of Example 1 but substituting pseudostrychnine for strychnidine there is obtained a mixture of 10ξ-hydroxy-23,24-secopseudostrychnidine and 21,22-dihydro-10ξ-hydroxy 23,24-secopseudostrychnidine which may be separated by chromatography on silica gel and eluting with the appropriate solvents.

Similarly by substituting another metal from Group I or II of the Periodic Table for sodium in Examples 1 to 3 and 5, the initial compound may be similarly reduced.

The invention may be variously otherwise embodied within the scope of the appended claims.

What is claimed is:

1. A compound of the formula:

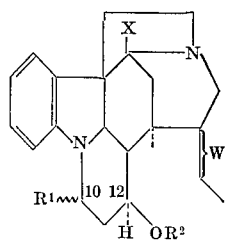

wherein W is selected from the group consisting of a double- bond and a saturated linkage between C-21 and C-22; X is hydrogen; $R^1$ is selected from the group consisting of hydrogen and hydroxy; $R^2$ is selected from the group consisting of hydrogen and acetyl, with the proviso that $R^2$ is acetyl only when $R^1$ is hydrogen.

2. A compound according to claim 1 that is 21,22-dihydro-10-hydroxy-23,24-secostrychnidine.

3. A compound according to claim 1 that is 10-hydroxy-23,24-secostrychnidine.

4. A compound according to claim 1 that is 21,22-dihydro-23,24-secostrychnidine.

5. A compound according to claim 1 that is 21,22-dihydro-23,24-secostrychnidine acetate.

(References on following page)

References Cited

UNITED STATES PATENTS

| | | | |
|---|---|---|---|
| 2,224,368 | 12/1940 | Musselman | 260—236 X |
| 2,586,661 | 2/1952 | Jacob | 260—236 X |
| 2,758,113 | 8/1956 | Zellneil | 260—236 |
| 3,015,661 | 1/1962 | Georgian | 260—287 |

OTHER REFERENCES

Merck Index, 7th ed., 1960, pp. 172-3, 986-7 relied on.

Manske: "The Alkaloids," vol. I, Academic Press, p. 411 relied on (1950).

Manske: "The Alkaloids," vol. VI (supplement to vols. I and II), Academic Press, p. 188 relied on (1960).

DONALD G. DAUS, Primary Examiner

U.S. Cl. X.R.

260—286, 288; 424—262